(12) United States Patent
Jurrens

(10) Patent No.: US 7,798,295 B2
(45) Date of Patent: Sep. 21, 2010

(54) AIR-BAG SUSPENSION SYSTEM

(76) Inventor: Jesse A. Jurrens, 3461 Whitewood Service Rd., Sturgis, SD (US) 57785

( * ) Notice: Subject to any disclaimer, the term of this patent is extended or adjusted under 35 U.S.C. 154(b) by 0 days.

(21) Appl. No.: 09/753,591

(22) Filed: Jan. 3, 2001

(65) Prior Publication Data

US 2002/0121413 A1 Sep. 5, 2002

(51) Int. Cl.
*F16D 57/00* (2006.01)

(52) U.S. Cl. .................. 188/266; 188/285; 180/227; 280/284

(58) Field of Classification Search .......... 188/266, 188/281, 298, 313, 314, 285, 299.1; 180/227, 180/219, 358; 280/283, 284, 285; 267/64.14, 267/64.21, 64.24, 64.28
See application file for complete search history.

(56) References Cited

U.S. PATENT DOCUMENTS

| | | | | |
|---|---|---|---|---|
| 3,603,611 A | * | 9/1971 | Wenham | 267/64.16 |
| 3,752,270 A | * | 8/1973 | Valdespino | 188/281 |
| 4,022,448 A | * | 5/1977 | Reeder | 267/226 |
| 4,153,266 A | * | 5/1979 | Uhls | 280/276 |
| 4,354,693 A | * | 10/1982 | Maeda et al. | 267/64.21 |
| 4,568,101 A | * | 2/1986 | Bleustein et al. | 180/227 |
| 4,688,774 A | * | 8/1987 | Warmuth, II | 267/64.21 |
| 4,712,776 A | * | 12/1987 | Geno et al. | 267/64.21 |
| 5,129,634 A | * | 7/1992 | Harris | 267/64.24 |
| 5,348,112 A | * | 9/1994 | Vaillancourt | 180/227 |
| 5,469,930 A | * | 11/1995 | Wiers | 180/227 |
| 5,487,443 A | * | 1/1996 | Thurm | 180/227 |
| 5,664,649 A | * | 9/1997 | Thompson et al. | 188/314 |
| 5,711,390 A | * | 1/1998 | Hikichi et al. | 180/219 |
| 5,752,692 A | * | 5/1998 | Crabtree et al. | 267/64.24 |
| 5,918,863 A | * | 7/1999 | Crabtree et al. | 267/64.24 |
| 6,003,628 A | * | 12/1999 | Jurrens et al. | 180/227 |
| 6,193,005 B1 | * | 2/2001 | Jurrens | 180/227 |
| 6,357,546 B1 | * | 3/2002 | Crosby, Jr. | 180/227 |
| 6,585,239 B2 | * | 7/2003 | Eichhorn et al. | 267/64.24 |
| 6,905,126 B1 | * | 6/2005 | Jurrens | 280/5.514 |

* cited by examiner

*Primary Examiner*—Pam Rodriguez
(74) *Attorney, Agent, or Firm*—Jeffrey A. Proehl; Woods, Fuller, Shultz & Smith, P.C.

(57) ABSTRACT

A suspension system for a motorcycle, comprising a motorcycle main frame, a swing arm pivotally mounted to the motorcycle main frame about a pivot axis, and an air-bag suspension system. The air-bag suspension system includes at least one air-bag constructed of an elastomeric material. The air-bag is housed within a housing assembly and is secured at one end to a piston located within the housing assembly and at its other end to an upper plate or end cap of the housing assembly. The housing assembly is attached to a shock absorber, and the shock absorber is attached at its forward end to the cross member plate of the motorcycle main frame and is pivotally attached at its rearward end to the lower transverse cross member of the swing arm.

21 Claims, 6 Drawing Sheets

AIR-BAG SUSPENSION SYSTEM

CROSS REFERENCES TO CO-PENDING APPLICATIONS

None.

BACKGROUND OF THE INVENTION

1. Field of the Invention

This invention relates generally to motorcycles, more particularly, to motorcycle suspension systems.

2. Description of the Prior Art

Harley-Davidson is a well known motorcycle manufacturer that manufactures a popular suspension system for its motorcycles under the trademark SOFTAIL®. The SOFTAIL® suspension system has no visible suspension components and thus mimics the desirable appearance of the Harley-Davidson "hard tail" frame in which the connecting arms of the rear wheel are rigidly fixed to the frame. The SOFTAIL® suspension system, which incorporates a swing arm and shock absorbers, dampens the effect of the rear wheel attachment, thereby affording an advantage over the "hard tail" frame by providing some suspension cushioning that improves the handling and riding comfort of the motorcycle.

In the SOFTAIL® suspension system, the swing arm pivotally attaches to the struts of the motorcycle main frame, thus enabling the rear wheel to arcuately move independently of the frame. The swing arm includes a pair of wheel mounts located on a wheel axis spaced to receive the rear wheel. The swing arm further includes pairs of arms extending from each of the wheel mounts and connectors connecting each pair of arms. Each connector is joined to the other connector by an upper transverse cross member and a lower transverse cross member. An intermediate transverse cross member extends through the connectors and through the frame struts of the motorcycle main frame. The swing arm is pivotal about this intermediate transverse cross member. The connectors have the same general size and shape as the frame struts of the main frame. Each connector is positioned adjacent and inside the corresponding frame struts so that they are hidden from view.

The standard or stock SOFTAIL® suspension system uses two shock absorbers mounted in parallel relationship with the motorcycle main frame. One end of each shock absorber is attached to the main frame and the other end is connected to a projection extending forwardly from the lower transverse cross member of the swing arm. The projection is adapted to receive a bolt or pin which connects the shock absorber to the projection. The main frame of the motorcycle hides the projection and shock absorbers from view, thereby retaining the aesthetic appearance of the desirable Harley-Davidson "hard tail" frame.

As mentioned previously, the SOFTAIL® suspension system affords an advantage over the "hard tail" frame by providing some suspension cushioning that improves the handling and riding comfort of the motorcycle. However, as discussed in U.S. Pat. No. 5,487,443 (hereinafter the '443 patent), significant disadvantages remain. For example, the ride remains too harsh and uncomfortable because of the very short travel of the shock absorbers.

As mentioned in the '443 patent, the maximum vertical movement of the rear wheel relative to the main frame is limited to two inches in either vertical direction before the swing arm contacts the main frame. The shock absorbers have an even smaller maximum travel of 1.5 inches, 0.75 inch in either direction from a center position. The result is that while the rear wheel may travel two inches in one direction from its centered position, the shock absorbers can only travel a distance of 0.75 inch. This limited distance of travel of the shock absorbers results in a hard, uncomfortable ride because all of the shock absorption must occur within this narrow range of movement.

Further, the short distance of travel mandates continual and rapid changes of the shock absorber shafts according to the movement of the wheel. Often, these directional changes of the shock absorber shafts cannot occur as fast as is necessary to create a smoother ride due to the inherent reluctance of the shock absorber shafts to rapidly change directions. As discussed in the '443 patent, this inherent reluctance to rapid directional change is due to the relatively large momentum forces involved, the inertial drag caused by the movement of the oil or gas within the shock absorbers, and the friction resistance caused by the seals and O-rings.

There have been previous attempts to improve the SOFTAIL® suspension system, but these attempts have had little success. For example, it has been attempted to increase the travel distance of the shock absorbers. This solution, however, offers only a modest improvement to the ride of the motorcycle because it does nothing for the responsiveness of the shock absorbers. Additionally, the range of movement of the swing arm is limited by the motorcycle frame, and therefore, the amount of travel of the shock absorbers is also limited. Any further increases in the shock absorber travel require modification to the motorcycle main frame, which is very undesirable. Other attempts have been made to improve the responsiveness of the shock absorbers; however, these attempts are hindered by the drag and friction forces discussed above.

In addition to the problems associated with the ride and handling of the standard or stock SOFTAIL® suspension system, many motorcycle enthusiasts attempt to lower the rear of the motorcycle for aesthetic reasons, believing it improves the appearance of the motorcycle. Special kits are sold to allow the frame to be lowered; however, the lowering of the rear of the motorcycle reduces the stroke on the suspension, as discussed above, resulting in a rougher ride.

Therefore, there remains a need for a motorcycle suspension system that maintains the aesthetic appearance of the SOFTAIL® frame while improving the ride, comfort and load adjustability of the motorcycle. There also remains a need for a motorcycle suspension system that enables the rear of the motorcycle to be raised and lowered when desired for aesthetic purposes and for load bearing capacity.

SUMMARY OF THE INVENTION

A suspension system for a motorcycle, comprising a motorcycle main frame, a swing arm pivotally mounted to the motorcycle main frame about a pivot axis, and an air-bag suspension system. The swing arm has a pair of wheel mounts located on a wheel axis spaced to receive the rear wheel. The swing arm further includes pairs of arms extending from each of the wheel mounts and connectors connecting each pair of arms. Each connector is joined to the other connector by an upper transverse cross member and a lower transverse cross member. An intermediate transverse cross member extends along the swing arm pivot axis and through the connectors and is secured to the struts of the motorcycle main frame.

The air-bag suspension system includes at least one air-bag constructed of an elastomeric material. The air-bag is housed within a housing assembly and is secured at one end to a piston located within the housing assembly and at its other end to an upper plate or end cap of the housing assembly. The housing assembly is attached to a shock absorber, and the shock absorber is attached at its forward end to the cross member plate of the motorcycle main frame and is pivotally attached at its rearward end to the lower transverse cross member of the swing arm.

In operation, when the rear wheel is caused to move upwardly or downwardly, the swing arm will also move arcuately upwardly or downwardly. The movement of the swing arm will pull or push the air-bag forwardly or rearwardly as the case may be. If the rear wheel is caused to move upwardly with respect to the main frame, the shock absorber is extended, causing the rear suspension to be compressed and lowering the rear end of the motorcycle. The rearward movement of the air-bag relative to the stationary motorcycle main frame causes the air-bag to compress, thus dampening the effect of the movement of the rear wheel. If the rear wheel is caused to move downwardly with respect to the main frame, the shock absorber is compressed, causing the rear suspension to be extended and raising the rear end of the motorcycle. The forward movement of the air-bag relative to the stationary motorcycle main frame causes the air-bag to stretch, thus dampening the effect of the movement of the rear wheel.

In the preferred embodiment, the air pressure in the air-bag is adjustable on the move by the use of a power switch operably connected to a small compressor mounted on the motorcycle.

It is an object of the present invention to provide an improved suspension system for a Harley-Davidson SOFT-AIL® motorcycle.

It is another object of the present invention to provide an improved suspension system for a Harley-Davidson SOFT-AIL® motorcycle without having to modify the motorcycle main frame or swing arm.

It is yet another object of the present invention to provide a way to easily adjust the stiffness of a motorcycle's ride while on the move to accommodate different loads.

It is still a further object of the present invention to enable the ride height of the motorcycle to be adjustable.

It is still a further object of the present invention to permit the frame of a motorcycle to be lowered when the motorcycle is stopped or when traveling at low speeds for appearance purposes and to be able to quickly raise the frame once again when traveling at faster speeds to reduce road hop.

BRIEF DESCRIPTION OF THE DRAWINGS

Other objects of the present invention and many of the attendant advantages of the present invention will be readily appreciated as the same becomes better understood by reference to the following detailed description when considered in connection with the accompanying drawings, in which like reference numerals designate like parts throughout the figures thereof and wherein.

DETAILED DESCRIPTION OF THE PREFERRED EMBODIMENT

Figure 1:
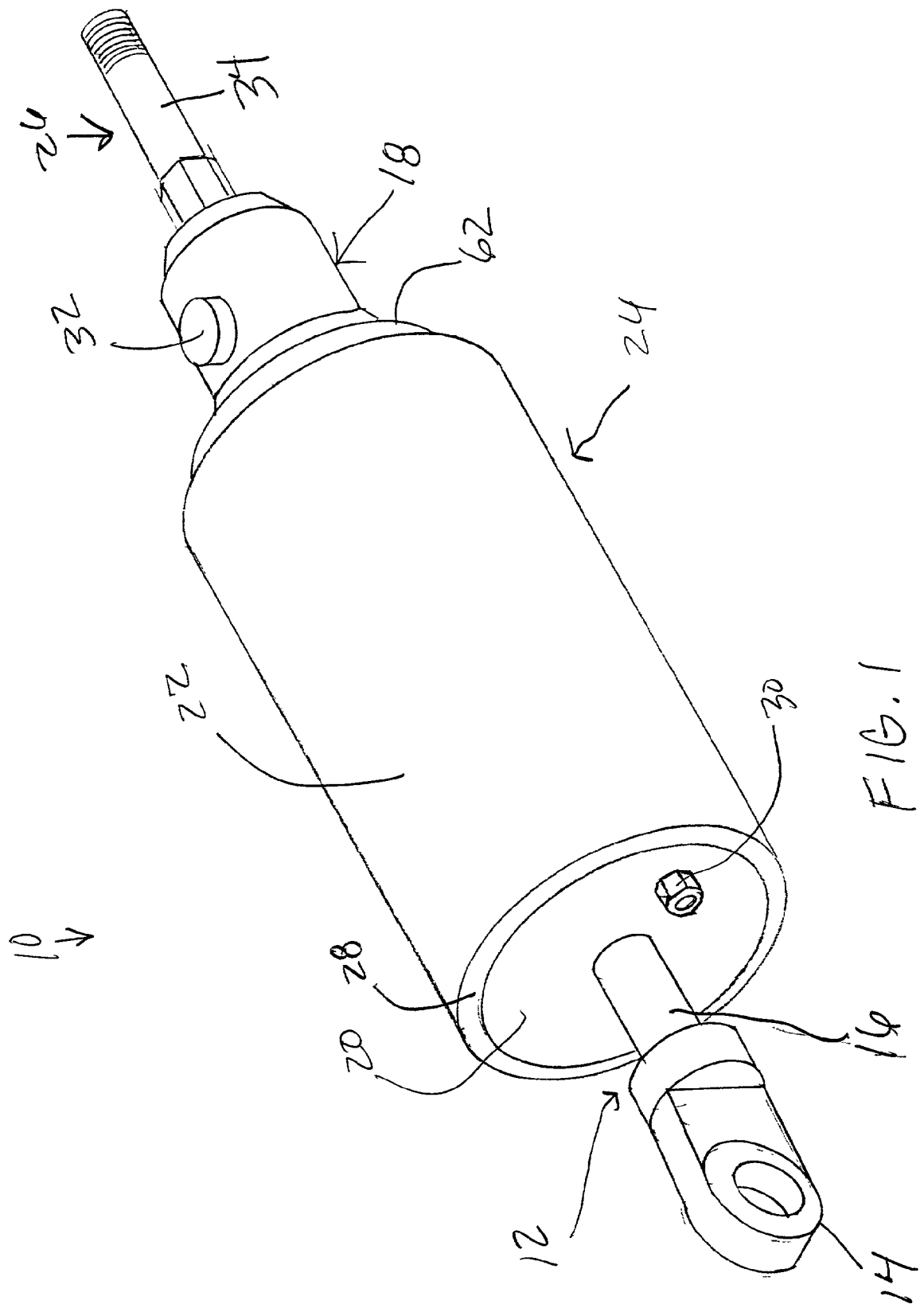
FIG. 1 illustrates an isometric view of an air-bag suspension system, the present invention.
Figure 2:
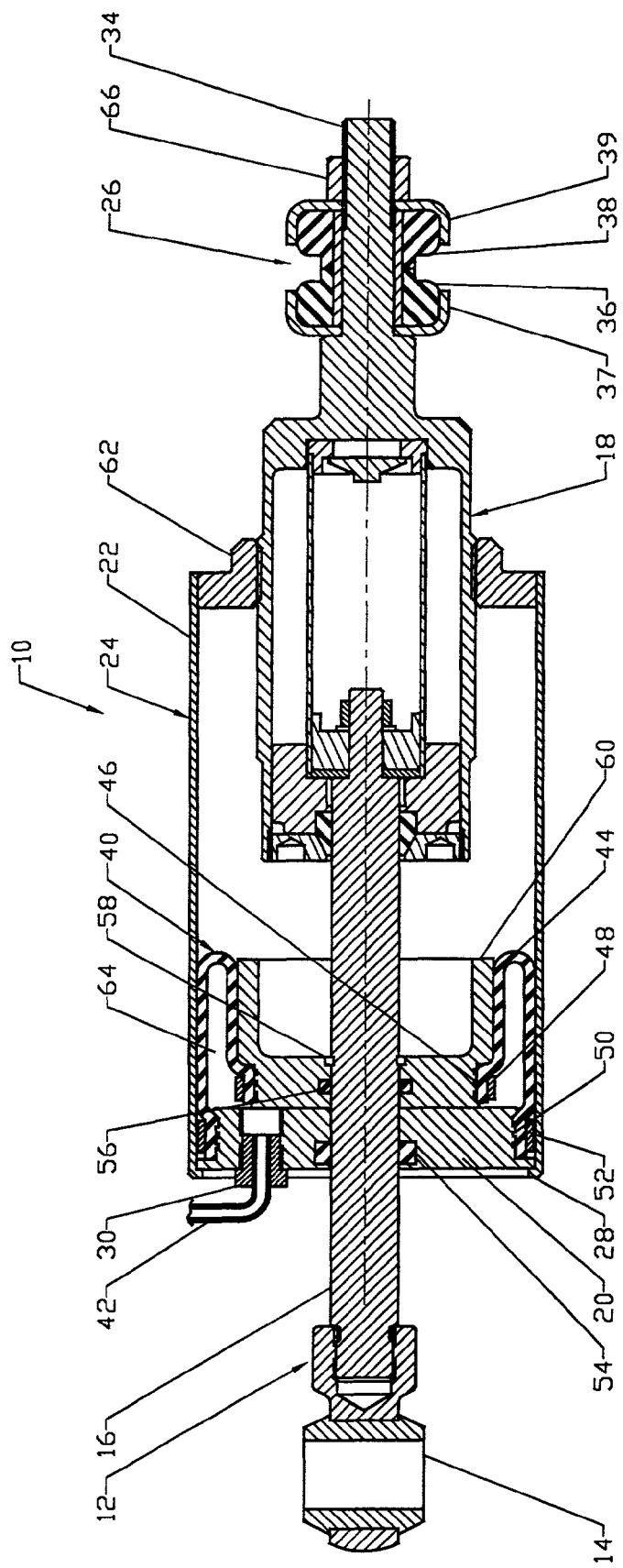
FIG. 2 illustrates a cross-sectional view of the air-bag suspension system where the shock absorber is extended.
Figure 3:
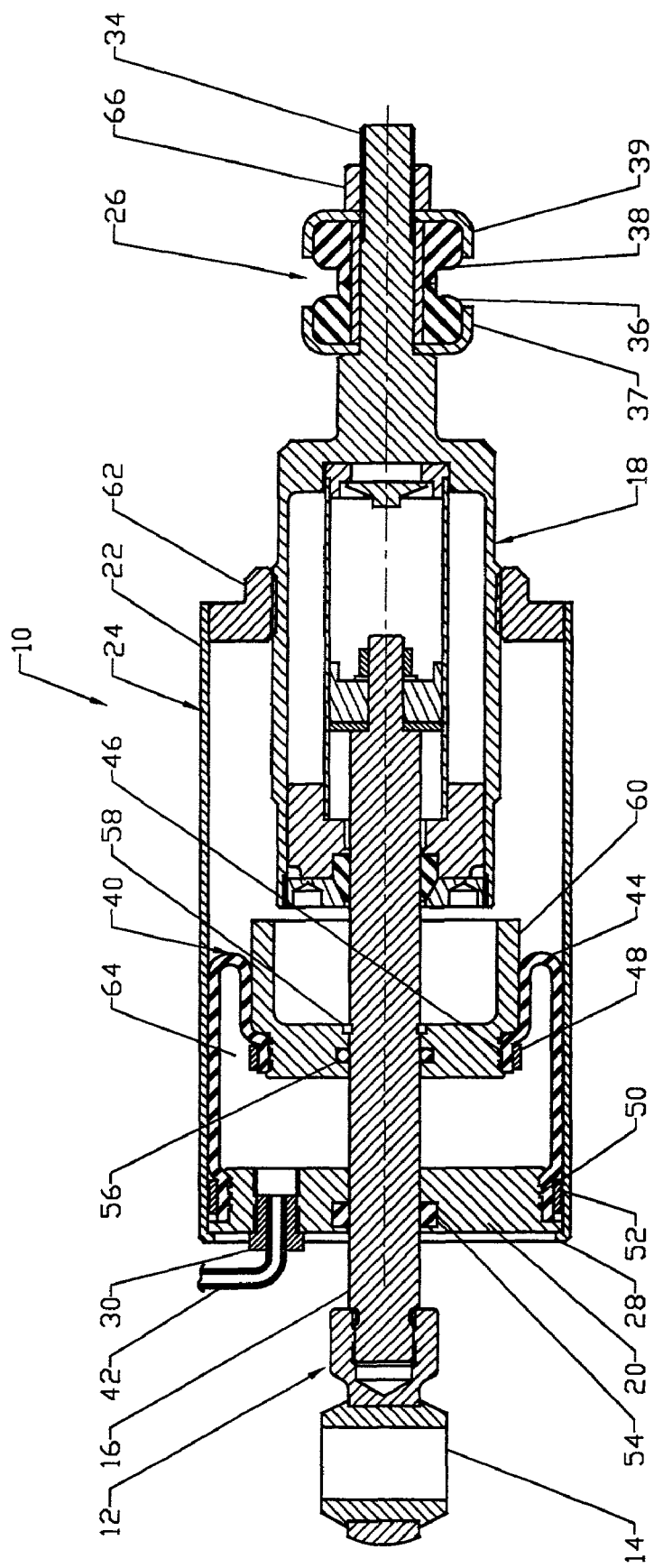
FIG. 3 illustrates a cross-sectional view of the air-bag suspension system where the shock absorber is at mid-stroke.
Figure 4:
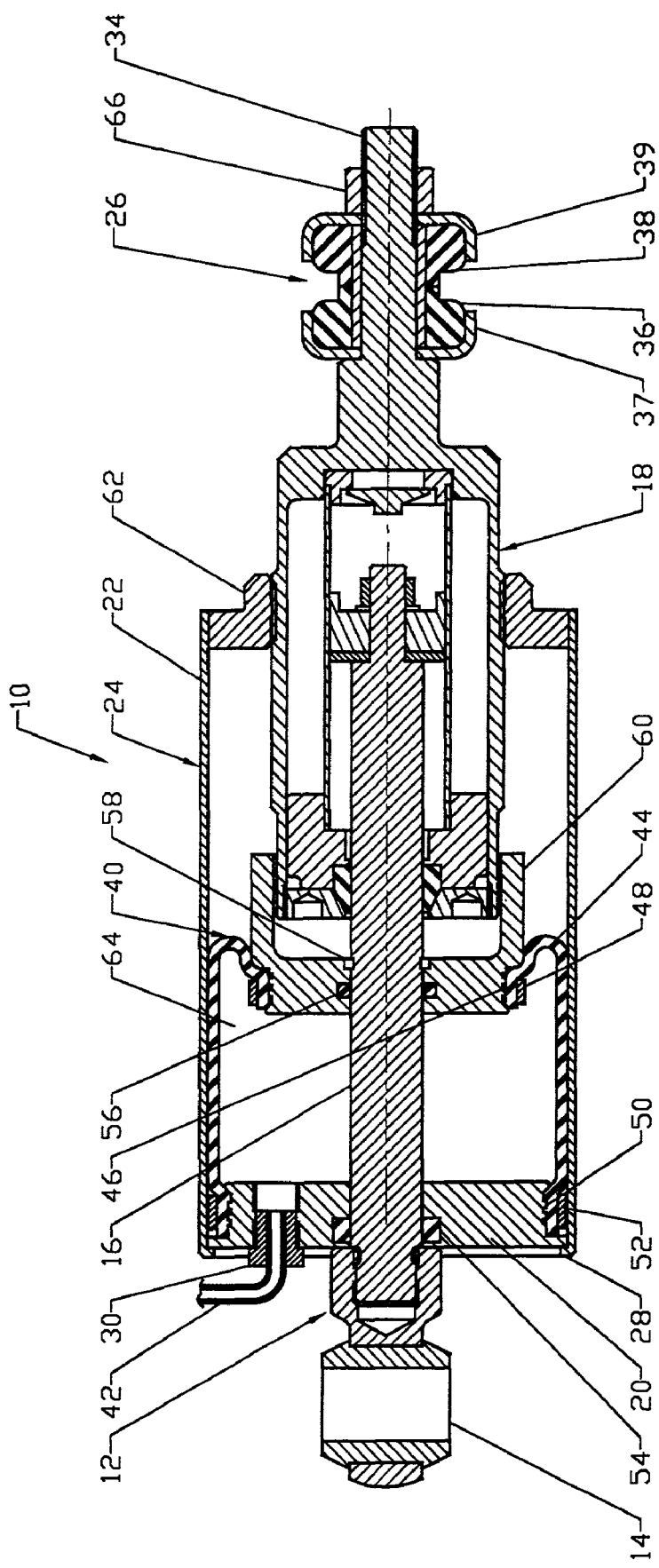
FIG. 4 illustrates a cross-sectional view of the air-bag suspension system where the shock absorber is compressed; and, FIG. 5 is a graph comparing the air-bag suspension system to a stock SOFTAIL® suspension system and illustrates the range of adjustment allowed by the air-bag suspension system.

FIG. 1 illustrates an isometric view of an air-bag suspension system 10, the present invention. The air-bag suspension system 10 is comprised of a shock absorber 12, a housing assembly 24, a main frame mounting assembly 26, and an air-bag assembly 40 (FIGS. 2-4). The shock absorber 12 incorporates a swing arm mount 14, a push rod 16, and a standard hydraulic assembly 18. The housing assembly 24 is comprised of an outer body member 22 having an inturned annular flange 28 at one end thereof and a mount 62 at the opposite end thereof, and an upper plate 20 (acting as an end cap and also serving as a component of the air-bag assembly 40, later described in detail) which bears against the inturned annular flange 28. The mount 62 secures the outer body member 22 to the hydraulic assembly 18. A pressure regulator knob 32 is incorporated into the hydraulic assembly 18 for adjusting the hydraulic assembly 18. The main frame mounting assembly 26 extends from the hydraulic assembly 18 and includes a threaded rod 34 and two identical bushings 36 and 38 with identical metal bushing caps 37 and 39 (illustrated in FIGS. 2-4). The housing assembly 24 contains the air-bag assembly 40 which compresses and thereby dampens the shock absorber 12, as will be described in detail in connection with FIGS. 2-4. A pair of identical air-bag suspension systems 10 replace the stock SOFTAIL® suspension system. The swing arm pivotally attaches to the swing arm mounts 14 of the identical air-bag suspension system 10, and the main frame mounting assemblies 26 of the identical air-bag suspension systems 10 rigidly attach to the cross member plate of the motorcycle main frame using the two identical bushings 36 and 38 and their respective identical bushing caps 37 and 39 (FIGS. 2-4), which sandwich the cross member plate and are secured by a nut 66 (FIGS. 2-4) thus enabling the rear wheel to arcuately move independently of the frame.

FIG. 2 illustrates a cross sectional view of the air-bag suspension system 10 where the shock absorber 12 is extended. When the shock absorber 12 is extended, the rear suspension is compressed and the motorcycle rear end will be fully lowered. The air-bag assembly 40 provides the means to control the travel of the shock absorber 12. The air-bag assembly 40 will now be described in detail. The air-bag assembly 40 is comprised of an air-bag 44 formed of an elastomeric material, a piston 60 having a lower air-bag flange 46, a retaining ring 58, a lower seal 56, a lower air-bag flange clamp 48, an air hose fitting 30, an air hose 42, the upper plate 20, which as previously mentioned bears against the inturned annular flange 28 of the outer body member 22 and acts as an end cap for the housing assembly 24, the upper plate or end cap 20 having an upper air-bag flange 50, an upper seal 54, and an upper air-bag flange clamp 52. The air-bag 44 is internally secured to piston 60 at lower air-bag flange 46 by lower air-bag flange clamp 48, and air-bag 44 is externally secured to upper plate 20 at upper air-bag flange 50 by upper air-bag flange clamp 52, creating an expandable and retractable air pocket 64 which communicates with an aperture extending through the upper plate 20. Air hose fitting 30 is attached at the aperture and allows air from air hose 42 created by an onboard compressor and regulator to enter air pocket 64. When the shock absorber 12 is extended and the rear suspension is compressed, piston 60 makes intimate contact with upper plate 20, limiting the extension of the shock absorber 12. In this fully lowered position, the rider will have a rigid-feeling suspension, similar to that of a "hard tail" with very little to no cushion.

Push rod 16 and hydraulic assembly 18 constitute a typical shock absorber or hydraulic dampener when combined. Retaining ring 58 secures piston 60 to the push rod 16 of the shock absorber 12. The lower seal 56, which is encased and fixed within piston 60, prevents the air inside air-bag 44 from leaking into or out of air pocket 64. Upper seal 54 slidingly engages push rod 16 and also prevents the air inside air-bag 44 from leaking into or out of air pocket 64 when the piston 60 and push rod 16 make forward or reverse travel. The travel will be further described in detail with reference to FIG. 3 and FIG. 4.

FIG. 3 illustrates a cross sectional view of the air-bag suspension system 10 where the shock absorber 12 is at mid-stroke, where all numerals correspond to those elements previously described. When the shock absorber 12 is at mid-stroke, the rear suspension is partially extended and the motorcycle rear end will be half way between the fully lowered and fully raised position. In order to reach the mid-stroke position, an onboard compressor introduces air into air-bag 44 through air hose 42 and air hose fitting 30. When the air is introduced into air-bag 44, air-bag 44 expands and piston 60 travels away from upper plate 20, compressing the shock absorber 12. In this half way position the rider will have a more cushioned ride than that of the fully lowered position.

FIG. 4 illustrates a cross sectional view of the air-bag suspension system 10 where the shock absorber 12 is compressed, where all numerals correspond to those elements previously described. When the shock absorber 12 is compressed, the rear suspension is extended and the motorcycle rear end will be in the fully raised position. In order to reach the fully raised position, an onboard compressor introduces air into air-bag 44 through air hose 42 and air hose fitting 30. When the air is introduced into air-bag 44, air-bag 44 expands and piston 60 travels away from upper plate 20, compressing the shock absorber 12. In this fully raised position the rider will have a higher load capacity which allows the rider to accommodate a passenger or a heavy baggage load without compromising comfort or handling.

Figure 5:
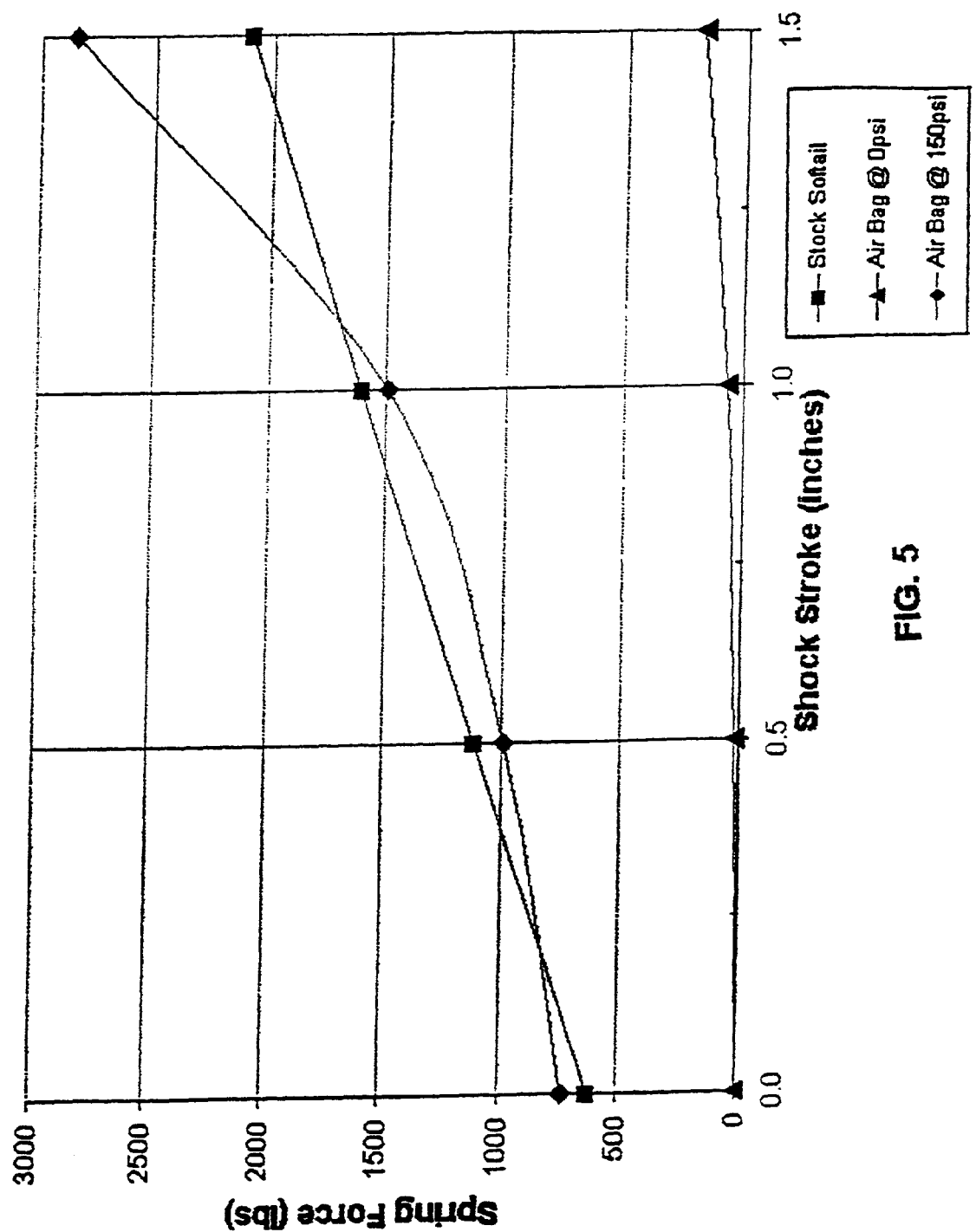

FIG. 5 is a graph comparing the air-bag suspension system to a stock SOFTAIL® suspension system and illustrates the range of adjustment allowed by the air-bag suspension system. The horizontal axis represents the travel of the shock absorbers, with "0.0" indicating the shock absorbers in the fully compressed position as shown in FIG. 4, and "1.5" indicating the shock absorbers in the fully extended position as shown in FIG. 2.

The vertical axis represents the supporting force provided by the spring elements of the suspension system. In the case of the stock SOFTAIL® suspension system, the spring elements consist of the coiled-wire springs, whereas in the case of the air-bag suspension system of the invention, these spring elements consist of inflatable air-bags.

The line marked by "squares" illustrates the stock SOFTAIL® suspension system, having an initial pre-load of approximately 600 lbs. and a constant spring rate of 980 lbs. per inch. These properties are "factory set," and do not allow the suspension system to be tailored to the riding conditions and/or the rider's preferences.

The curve marked by "triangles" illustrates the air-bag suspension at its minimal setting of 0 psi., which allows the shock absorber to easily extend, thereby lowering the frame.

The curve marked with "diamonds" illustrates the air-bag suspension at its maximum initial setting of 150 psi., which compresses the shock absorber with an initial pre-load of approximately 700 lbs., thereby raising the frame.

As the motorcycle is burdened by the rider(s) and cargo, the additional weight causes the shock absorber to extend and the air-bag to compress. As the air-bag compresses, the volume of air inside is reduced exponentially in relation to the stroke. This action increases the pressure inside the air-bag exponentially, thus increasing the supporting force exponentially as well. This characteristic provides a truly progressive suspension without the complexity of a mechanical linkage, as found on many other motorcycles.

The area between the two curves represents the indefinitely adjustable range of the air-bag suspension. This allows the suspension to be tailored to the riding conditions and/or the rider's preferences.

Figure 6:
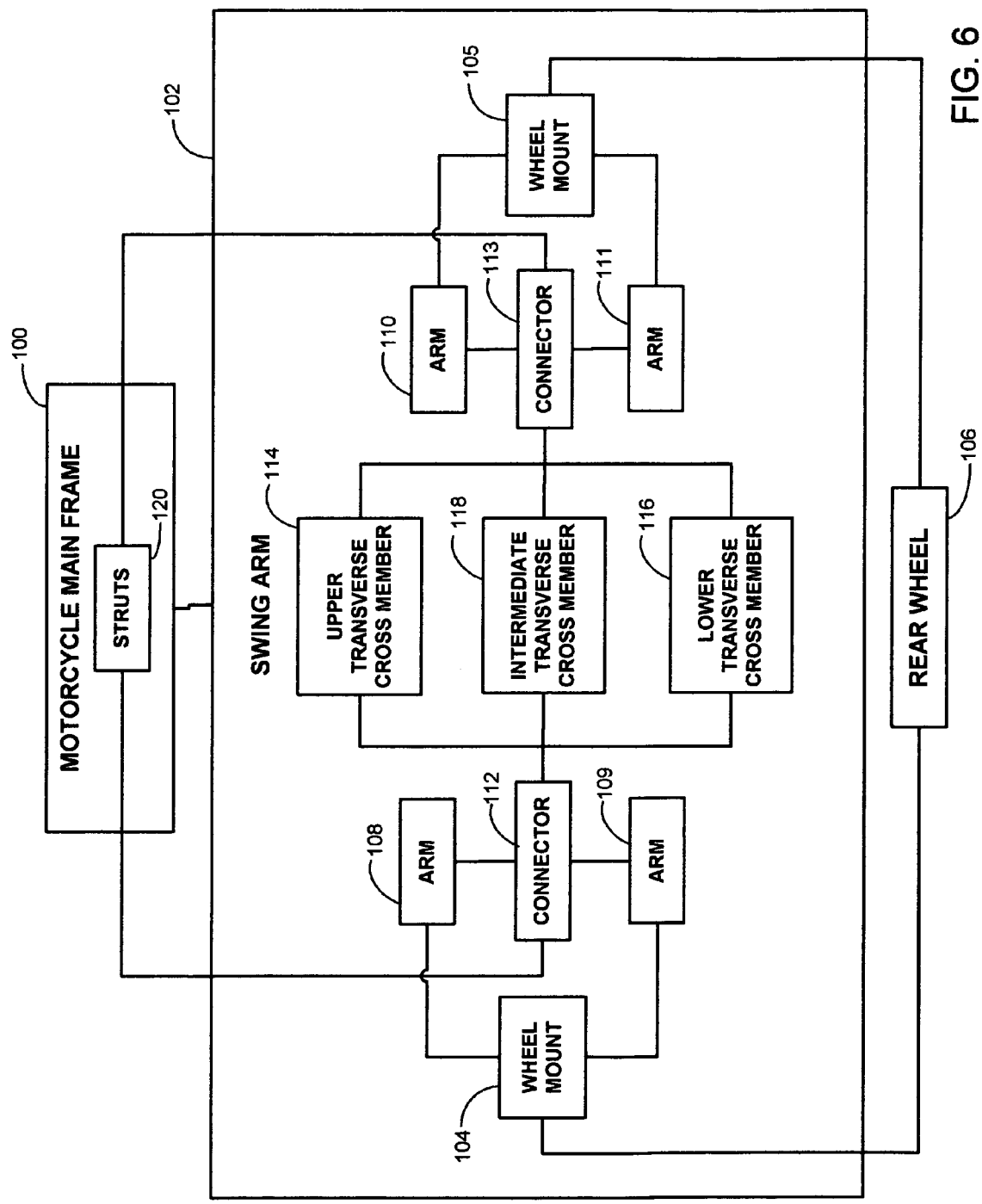
FIG. 6 illustrates a schematic diagram of a motorcycle with an air-bag suspension system of the present invention.

As schematically illustrated in FIG. 6 of the drawings, the suspension system for a motorcycle may suitably be employed on a motorcycle main frame 100, a swing arm 102 pivotally mounted to the motorcycle main frame 100 about a pivot axis, and an air-bag suspension system 10. The swing arm 102 has a pair of wheel mounts 104, 105 located on a wheel axis spaced to receive the rear wheel 106. The swing arm 102 further includes pairs of arms 108, 109 and 110, 111 extending from each of the wheel mounts 104, 105 and connectors 112, 113 connecting each pair of arms 108, 109 and 110, 111. Each connector 112 is joined to the other connector 113 by an upper transverse cross member 114 and a lower transverse cross member 116. An intermediate transverse cross member 118 extends along the swing arm pivot axis and through the connectors 112, 113 and is secured to the struts 120 of the motorcycle main frame 100.

MODE OF OPERATION

With additional reference to FIGS. 2-4, the mode of operation is now described. When all air pressure is released from air-bag 44, the shock absorber 12 is extended, compressing the rear suspension, collapsing air-bag 44, causing piston 60 to make contact with the interior of end cap 20 and lowering the rear end of the motorcycle to its lowest ride height (FIG. 2).

As pressurized air is introduced into the air-bag 44, piston 60 travels away from end cap 20 and toward the hydraulic assembly 18. Shock absorber 12 begins compressing and the rear suspension begins extending and raising the rear end of the motorcycle. FIG. 3 illustrates this mid-stroke position.

As even more pressurized air is introduced into the air-bag 44, near its maximum capacity, piston 60 travels further toward the hydraulic assembly 18, but no contact is made. Shock absorber 12 is now fully compressed and the rear suspension is fully extended, raising the rear end of the motorcycle to its highest ride height (FIG. 4).

In accordance with the graph shown in FIG. 5 it can be seen that the air-bag suspension system 10 offers an arcuate range of travel and adjustment compared to that of a stock SOFTAIL® suspension system.

Various modifications can be made to the present invention without departing from the apparent scope hereof.

| AIR-BAG SUSPENSION SYSTEM | |
| --- | --- |
| PARTS LIST | |
| 10 | air-bag suspension system |
| 12 | shock absorber |
| 14 | swing arm mount |
| 16 | push rod |
| 18 | hydraulic assembly |
| 20 | upper plate or end cap |
| 22 | outer body member |
| 24 | housing assembly |
| 26 | main frame mounting assembly |
| 28 | annular flange |

-continued

AIR-BAG SUSPENSION SYSTEM
PARTS LIST

| | |
|---|---|
| 30 | air hose fitting |
| 32 | pressure regulator knob |
| 34 | threaded rod |
| 36 | bushing |
| 37 | bushing cap |
| 38 | bushing |
| 39 | bushing cap |
| 40 | air-bag assembly |
| 42 | air hose |
| 44 | air-bag |
| 46 | lower air-bag flange |
| 48 | lower air-bag flange clamp |
| 50 | upper air-bag flange |
| 52 | upper air-bag flange clamp |
| 54 | upper seal |
| 56 | lower seal |
| 58 | retainer ring |
| 60 | piston |
| 62 | mount |
| 64 | air pocket |
| 66 | nut |

It is claimed:

1. A suspension device for connecting to a frame of a vehicle and a swing arm on which a wheel of the vehicle is mounted, the suspension device comprising:
   a housing defining an interior;
   a shock absorber mounted on the housing, the shock absorber including a rod movably mounted on the housing such that at least a portion of the rod extends into the interior of the housing and through the housing;
   a piston positioned in the interior of the housing and being mounted on the rod of the shock absorber to move with the rod;
   an air-bag positioned within the interior of the housing, the air bag being constructed of elastomeric material, the air-bag having a first end mounted on the housing in the interior of the housing and a second end mounted on the piston such that the piston, the housing, and the air bag collectively define an air chamber within the housing;
   wherein the housing completely encloses the air-bag.

2. The suspension device of claim 1 wherein the air bag includes a perimeter wall with a pair of opposite ends, a first one of the opposite ends of the perimeter wall being mounted on the housing and a second one of the opposite ends of the perimeter wall being mounted on the piston.

3. The suspension device of claim 2 wherein each of the opposite ends of the perimeter wall includes a perimeter flange defining an opening, the perimeter flange at a first one of the opposite ends being secured to the housing and the perimeter flange at a second one of the opposite ends being secured to the piston.

4. The suspension device of claim 2 wherein each of the opposite ends of the perimeter wall define an opening, a first one of the openings of the perimeter wall receiving a portion of an end cap of the housing and a second one of the openings of the perimeter wall receiving a portion of the piston.

5. The suspension device of claim 4 wherein the end cap seals the opening in the first end of the perimeter wall and the piston seals the opening in the second end of the perimeter wall.

6. The suspension device of claim 1 wherein the shock absorber includes a hydraulic piston and cylinder assembly, the cylinder of the shock absorber being mounted on the housing and the piston of the shock absorber being mounted on the rod, the rod being configured to mount on one element of the frame and the swing arm and the cylinder being configured to mount on the other element of the frame and the swing arm.

7. The suspension device of claim 1 wherein a degree of pressurization of air in the air-bag is adjustable.

8. The suspension device of claim 1 wherein the air-bag is characterized by a support spring force which is a function of compression stroke.

9. The suspension device of claim 8 wherein air in the air-bag can be pressurized to alter the support spring force function of compression stroke.

10. The suspension device of claim 8 wherein the support spring force is a progressive function of compression stroke.

11. The suspension device of claim 10 wherein increasing air pressure in the air-bag increases the progressive function of support spring force to a compression stroke.

12. The suspension device of claim 8 wherein the support spring force is an exponential function of compression stroke.

13. The suspension device of claim 1 wherein the piston defines a cavity located opposite of the air chamber that is capable of receiving a portion of the shock absorber upon compression of the suspension device.

14. A suspension device for connecting to a frame of a vehicle and a swing arm on which a wheel of the vehicle is mounted, the suspension device comprising:
   a housing defining an interior;
   a shock absorber mounted on the housing, the shock absorber including a rod movably mounted on the housing such that at least a portion of the rod extends into the interior of the housing and through the housing;
   a piston positioned in the interior of the housing and being mounted on the rod of the shock absorber to move with the rod;
   an air-bag positioned within the interior of the housing, the air bag being constructed of elastomeric material, the air-bag having a first end mounted on the housing in the interior of the housing and a second end mounted on the piston such that the piston, the housing, and the air bag collectively define an air chamber within the housing;
   wherein the housing abuts against substantially an entire circumference of the air-bag.

15. The suspension device of claim 14 wherein a degree of pressurization of air in the air-bag is adjustable.

16. The suspension device of claim 14 wherein the air-bag is characterized by a support spring force which is a function of compression stroke.

17. The suspension device of claim 16 wherein air in the air-bag can be pressurized to alter the support spring force function of compression stroke.

18. The suspension device of claim 16 wherein the support spring force is a progressive function of compression stroke.

19. The suspension device of claim 18 wherein increasing air pressure in the air-bag increases the progressive function of support spring force to a compression stroke.

20. The suspension device of claim 16 wherein the support spring force is an exponential function of compression stroke.

21. The suspension device of claim 14 wherein the housing abuts against substantially an entire length of the air-bag when the air-bag is fully extended.

* * * * *